Patented Mar. 7, 1933

1,900,173

UNITED STATES PATENT OFFICE

ALBERT A. EPSTEIN, OF NEW YORK, N. Y.

BRIQUETTE AND PROCESS OF MANUFACTURE

No Drawing.   Application filed March 25, 1931.   Serial No. 525,337.

This invention relates to a fuel briquette and process of manufacture and has for its primary object the utilization of a coffee bean residue as the fuel element.

An object of the invention is the production of fuel briquettes from coffee grounds that are bound together to enable the briquettes to be more readily and satisfactorily handled in transportation and will possess all physical and chemical properties necessary to support intense combustion.

Another object of the invention is the production of a fuel briquette that will enable utilization of a waste product that is now disposed of in small quantities over an extended territory, but which may be accumulated in bulk for the economical manufacture of a fuel as herein set forth.

Another object of the invention resides in the extraction of aroma oils from coffee beans and forming the residue into briquettes that are treated in a manner to retain their shape under all commercial conditions.

Besides the above my invention is distinguished in the combination of ground coffee beans and a binder whereby coffee by-products may be utilized as a fuel.

My process consists broadly in extracting from the coffee bean aroma oils by an extracting treatment and then subjecting the residue after drying to the binding action of a binder so that the mixture may be readily pressed into briquette form and dried.

While many attempts have been made to utilize waste vegetable products as fuel briquettes, I am of the opinion that I am the first to utilize coffee as the fuel element thereby enabling profitable use of coffee grounds, that are now disposed of as waste material. It is true that the disposal of coffee refuse is in such small quantities that it is not profitable to accumulate such small quantities for the purpose of economically producing fuel briquettes, but referring to my co-pending application filed January 3rd, 1931, Serial No. 506,485, I have set forth a method for the production of a coffee extract paste which in its making will produce large quantities of coffee residue that can be used as the fuel element in the production of fuel briquettes, the subject matter of the present application.

As is well known an average analysis of raw coffee is as follows:

|  | Per cent |
|---|---|
| Water | 10.73 |
| Nitrogeneous substances | 12.64 |
| Caffein | 1.27 |
| Sugar | 8.62 |
| Other nitrogen free extractives | 19.30 |
| Dextrin | .86 |
| Tannic acid | 9.02 |
| Crude fibre | 24.0 |
| Ash | 3.0 |
| Aqueous extract | 30.35 |
| Ether extract | 11.8 |

An average analysis of roasted coffee is as follows:

|  | Per cent |
|---|---|
| Moisture | 2.16 |
| Ash | 4.03 |
| Caffein | 1.20 |
| Sugar | .75 |
| Crude fibre | 13.03 |
| Cold aqueous extract | 22.63 |
| Petroleum ether extract | 13.75 |
| Total nitrogen | 2.27 |

From the above it will be appreciated that the residue resulting from the extracting of aroma oils, amounts to a considerable portion of the coffee bean which may be burned, leaving a relatively small amount of ash.

Considering my invention in detail I extract the aroma oils from coffee beans by a wet treatment as set forth in my co-pending application filed January 3rd, 1931, Serial No. 506,485 which results in the accumulation of large quantities of a fibrous residue in a wet state to be subjected to a drying operation.

After the residue has been properly dried, it is mixed with an inflammable binder, such as petroleum, coal tar waste, pitch or resin, so as to produce a pasty mass that can be pressed into briquette form by a suitable type of molding machine. The briquettes may be dried while in the molds, in any manner well known in the trade, or may be subjected to a drying action after removal from the machine depending upon which is the most advantageous in practice.

I have found that satisfactory results can be accomplished by adding to 100 parts of dry coffee residue, 5 parts of petroleum waste, the mixture being thoroughly agitated and then pressed into briquette forms that are placed in a retort or kiln and heated at a temperature between 200 and 250 degrees centigrade.

I am aware of the fact that pulverized material and waste products have been formed into fuel briquettes and dried, utilizing various types of binders, but I am of the opinion that I am the first in a continuous process to grind coffee, extract the aroma oils therefrom, mix the coffee residue with a binder, mold the same and finally dry.

I am also of the opinion that I am the first to form a fuel briquette from coffee residue thereby enabling utilization of a coffee by-product as a fuel capable of producing intense heat with practically no smoke and a very small amount of ash.

Of course, it is to be understood that certain ingredients of the product may be changed or varied in proportion without departing from the spirit of the invention and the method may be varied in a limited way and therefore I do not desire to be limited in protection in any manner whatsoever except as set forth in the following claims:

What I claim is:

1. A method of producing fuel briquettes which consists in mixing coffee residue with an inflammable binding fluid and pressing into briquette shape.

2. A method of producing fuel briquettes which consists in mixing coffee residue with an inflammable fluid and molding into a briquette form and finally drying.

3. A method of producing a fuel briquette which consists in mixing dry granulated coffee residue with a coal tar waste, molding the mixture into briquette form and drying.

4. A method of producing a fuel briquette which consists in drying coffee ground residue, mixing therewith approximately 5 parts of an inflammable substance, molding the mixture into briquette form and heating at a temperature between 200 and 250 degrees centigrade.

5. A method of producing a fuel briquette which consists in grinding coffee beans, extracting therefrom the aroma oils, drying the residue, adding thereto an inflammable substance and molding into briquette form.

6. A method of producing a fuel briquette which consists in grinding coffee beans, extracting therefrom the aroma oils, drying the residue, adding thereto an inflammable substance and molding into briquette form.

7. A fuel briquette consisting of an intimate mixture of coffee residue and an inflammable binder.

8. A fuel briquette consisting of an intimate mixture of dried coffee grounds and an inflammable binder, pressed into briquette form and dried.

9. A fuel briquette consisting of an intimate mixture of coffee ground residue and a coal tar waste binder, molded into briquette form and dried.

10. A fuel briquette consisting of an intimate mixture of the fibrous structure of coffee beans and a coal tar waste.

11. A fuel briquette comprising an intimate mixture of the fibrous structure of the coffee bean and 5 parts of coal tar waste, pressed into briquette form and dried.

12. A method of producing a fuel briquette which consists in molding by pressure coffee residue resulting from the extraction of the aroma oils therefrom.

In witness whereof I have hereunto set my hand.

ALBERT A. EPSTEIN.